United States Patent
Stechschulte et al.

(10) Patent No.: US 9,114,300 B2
(45) Date of Patent: Aug. 25, 2015

(54) DUAL FORCE PLATE APPARATUS

(75) Inventors: Theodore J. Stechschulte, Maumee, OH (US); Glenn E. Klopping, Millbury, OH (US); Richard Batista, Millbury, OH (US); Joseph L. Young, Toledo, OH (US)

(73) Assignee: I/P Solutions, Inc., Perrysburg, OH (US)

(*) Notice: Subject to any disclaimer, the term of this patent is extended or adjusted under 35 U.S.C. 154(b) by 0 days.

(21) Appl. No.: 13/261,777

(22) PCT Filed: May 11, 2012

(86) PCT No.: PCT/US2012/037474
§ 371 (c)(1),
(2), (4) Date: Jan. 22, 2014

(87) PCT Pub. No.: WO2012/155025
PCT Pub. Date: Nov. 15, 2012

(65) Prior Publication Data
US 2014/0148929 A1    May 29, 2014

Related U.S. Application Data

(60) Provisional application No. 61/485,296, filed on May 12, 2011.

(51) Int. Cl.
| G06F 19/00 | (2011.01) |
| A63B 69/36 | (2006.01) |
| A63B 24/00 | (2006.01) |
| A63B 69/00 | (2006.01) |
| A63B 69/38 | (2006.01) |

(52) U.S. Cl.
CPC ............ *A63B 69/36* (2013.01); *A63B 24/0006* (2013.01); *A63B 69/3623* (2013.01); *A63B 69/3667* (2013.01); *A63B 69/002* (2013.01); *A63B 69/38* (2013.01); *A63B 2069/367* (2013.01); *A63B 2210/50* (2013.01); *A63B 2220/13* (2013.01); *A63B 2220/50* (2013.01); *A63B 2220/62* (2013.01); *A63B 2220/80* (2013.01); *A63B 2220/803* (2013.01); *A63B 2220/833* (2013.01); *A63B 2225/20* (2013.01); *A63B 2225/50* (2013.01)

(58) Field of Classification Search
USPC .................... 700/91–93; 273/317.1, 317.2
See application file for complete search history.

(56) References Cited

U.S. PATENT DOCUMENTS

| 5,118,112 A | 6/1992 | Bregman et al. | |
| 5,150,902 A | 9/1992 | Heisler | |
| 5,419,562 A | 5/1995 | Cromarty | |
| 5,697,791 A | 12/1997 | Nashner et al. | |
| 6,039,658 A | 3/2000 | Cecchin | |
| 6,179,724 B1* | 1/2001 | Yang et al. | 473/279 |
| 6,402,635 B1 | 6/2002 | Nesbit et al. | |
| 7,131,911 B2* | 11/2006 | Kim | 473/279 |
| 7,161,097 B1 | 1/2007 | Gorgone | |
| 7,946,928 B2 | 5/2011 | Mooney | |
| 8,210,957 B2* | 7/2012 | Nam | 473/132 |
| 2002/0128084 A1* | 9/2002 | Lee et al. | 473/132 |
| 2010/0267462 A1 | 10/2010 | Mooney | |

* cited by examiner

*Primary Examiner* — Ronald Laneau
(74) *Attorney, Agent, or Firm* — Marshall & Melhorn, LLC

(57) ABSTRACT

An apparatus for analyzing a golf swing or other biomechanical movement includes first and second rectangular force plate mounted within a respective first and second rigid rectangular frame by means of at least one load cell proximate each corner of each rectangular force plate. The second rigid rectangular frame being secured to the first rigid rectangular frame so as to prevent relative lateral movement therebetween, and each of the load cells is operably connected to one or more microprocessor devices for receiving a signal generated by each of the load cells indicative of a force applied thereto.

15 Claims, 6 Drawing Sheets

DUAL FORCE PLATE APPARATUS

CROSS-REFERENCE TO RELATED APPLICATIONS

This application is claiming the benefit, under 35 U.S.C.§119(e), of the provisional application filed May 12, 2011 under 35 U.S.C.§111(b), which was granted Ser. No. 61/485,296. This provisional application is hereby incorporated by reference in its entirety.

BACKGROUND OF THE INVENTION

The invention relates to an apparatus for analyzing a golf swing or other biomechanical movement used repetitively in sports activity or simulated sports environmental activity setting or to assess medical and biomechanical functions of the human body, specifically to such an apparatus employing dual force plates.

Elements and characteristics of an individual's performance during a physical, biomechanical or other sports activity, such as swinging a golf club or tennis racquet, kicking a soccer ball or football, can be analyzed to improve and optimize performance and develop better technique. This requires computerized input and analysis, since the activity during the relevant action is quick, and multiple elements are occurring nearly simultaneously, often beyond the conscious knowledge of the player involved. When all of the data is collected and analyzed, it needs to be conveyed back to the golfer or other player in an immediate and easily comprehensible way so that difficulties can be noted and corrected with repetition of the activity and comparative re-analysis.

Sports action analysis devices, often golf swing devices with other adaptations possible, have been available for decades. In their simplest computerized form, the devices include a foot plate or plates and sensors to analyze weight shift. These have evolved in complexity as computers have evolved, and current devices outstrip their predecessors in ability to analyze the components of a golf swing or other repetitive sports move, although an optimum device has yet to be developed.

Kretsinger (U.S. Pat. No. 3,169,022) patented a simple device in 1965 that contains two completely independent foot plates and a row of indicator lamps in front of each that light up to show which foot bears most of the weight; the light pattern freezes at the time of ball strike. No memory of the swing is available, and swing to swing comparison is not possible.

Other later devices, such as those seen in work by Bregman (U.S. Pat. No. 5,118,112), Heisler (US Pat. No. 5,150,902), Cromarty (U.S. Pat. No. 5,419,562), and Nesbit (U.S. Pat. No. 6,402,635), feature small, independent footplates that have to be separable and able to be angled in relation to each other to accommodate the golfer's most comfortable stance. Such plates can determine the proportion of total weight on each, but cannot provide data on center of gravity because the computer does not know the position of one in relation to the other. The foot pads can also potentially slip apart during use.

Several of the devices, notably those of Heisler and Cromarty and another by Cecchin (U.S. Pat. No. 6,039,658), include two foot plates that measure total weight on each foot, but are unable to differentiate weights from different portions of the foot, such as the heel and toes or the inside versus the outside of the foot. Data from these devices is often in the form of two continuous, intertwining graphs, one from each foot's weight during the weight shifting of a swing, sometimes shown along with a video image of the golfer.

Detailed interpretation of these lines and correction of the swing often requires the assistance of a skilled third party.

Advances in the art produced devices that could differentially measure the forces of the toe and heel portions of the foot. Bregman asserts this, but does not specifically teach how this information is collected. Nesbit and Mooney (U.S. Pat. No. 7,946,928) have cantilevered devices to measure heel and toe weights, but in each case the foot pads, like Bregman's, are separate and movable, so the center of gravity cannot be measured.

Key components of a golf swing have been chosen in the past as the focus of the devices. There has been some disagreement about which features are the most key. Bregman's and Cecchin's devices collect data from three non-identical points in the swing. Cecchin requires the activation of a timer at pre-swing, apparently by a third party, which takes measurements then and at two other timed points, which are presumed to be maximum backswing and follow-through. This raises the possibility that these measurements may be slightly off of the maximums that should be measured if the swing does not progress at the presumed speed. Mooney's device concentrates on six featured areas of the swing, from addressing the ball through follow-through. It compares the player's golf swing to previously-loaded typical and probable sequences and times of occurrence of feature events in golf swings. It determines the timing of the selected feature events of the player's swing by assigning probabilities of finding feature events at different time periods of the swing by comparison to when these events occur in the sample information. This also raises the possibility that the actual times when the feature events occur in the player's swing may not be exactly when predicted and measured by the pre-set timing parameters of the device.

Measuring parameters from the entire swing, not at pre-selected and possibly not entirely accurate moments, would be optimal to give the player data from the true key points and the fullest amount of possible feedback so that he could work on smoothly correcting his deficiencies throughout his sports action and chart his overall improvement.

In addition, a common disadvantage of the previous devices has been that they have been non-portable and connected to computers via bulky cables.

None has been capable of being taken outside for simulation in the yard or at an actual driving range or golf course.

From the foregoing, it is apparent that improvements are needed to produce such a more complete and versatile sports action device.

SUMMARY OF THE INVENTION

An apparatus for analyzing a golf swing or other biomechanical movement includes first and second rectangular force plates mounted within respective first and second rigid rectangular frames by means of at least one load cell proximate each corner of each rectangular force plate. These are rectangular in the sense that each defines a rectangular outline when viewed in plan. The second rigid rectangular frame is secured to the first rigid rectangular frame so as to prevent relative lateral movement therebetween, and each of the load cells is operably connected to one or more microprocessor devices for receiving a signal generated by each of the load cells indicative of a force applied thereto.

In a preferred embodiment, the second rigid rectangular frame is secured to the first rigid rectangular frame by one or more hinges so that the apparatus is selectively movable from a first extended position in which the first and second frames are substantially coplanar and relative lateral movement between the frames is prevented, and a second folded position. In this embodiment, the apparatus is readily portable.

In another preferred embodiment, the first plate is recessed within the first frame, the uppermost surface of the first plate being spaced below the uppermost surface of the first frame, and the second plate is recessed within the second frame, the uppermost surface of the second plate being spaced below the uppermost surface of the second frame.

BRIEF DESCRIPTION OF THE DRAWINGS

The advantages of the invention will become readily apparent to those skilled in the art from the following detailed description of various embodiments when considered in the light of the accompanying drawings, in which.

DETAILED DESCRIPTION OF THE INVENTION

It is to be understood that the specific devices and processes illustrated in the attached drawings and described in the following description are simply exemplary embodiments of the inventive concepts defined in the appended claims. Hence, specific dimensions and other physical characteristics relating to the embodiments disclosed herein should not be considered as limiting, unless the claims expressly state otherwise.

The apparatus of the invention is a golf or other sports action device for use outside, away from home, or wherever the user or player desires, that accurately and sensitively measures weight and forces on each foot, the heel and toe positions, and the positions of the inside and outside of each foot during a golf swing or similar activity by employing a chassis device with two independent but physically joined force plates and frames, each plate being mounted within its respective frame by at least four load cells. The portion of the frame about the first force plate is secured to the portion of the frame about the second force plate such that later movement between the two is prevented.

Figure 1:
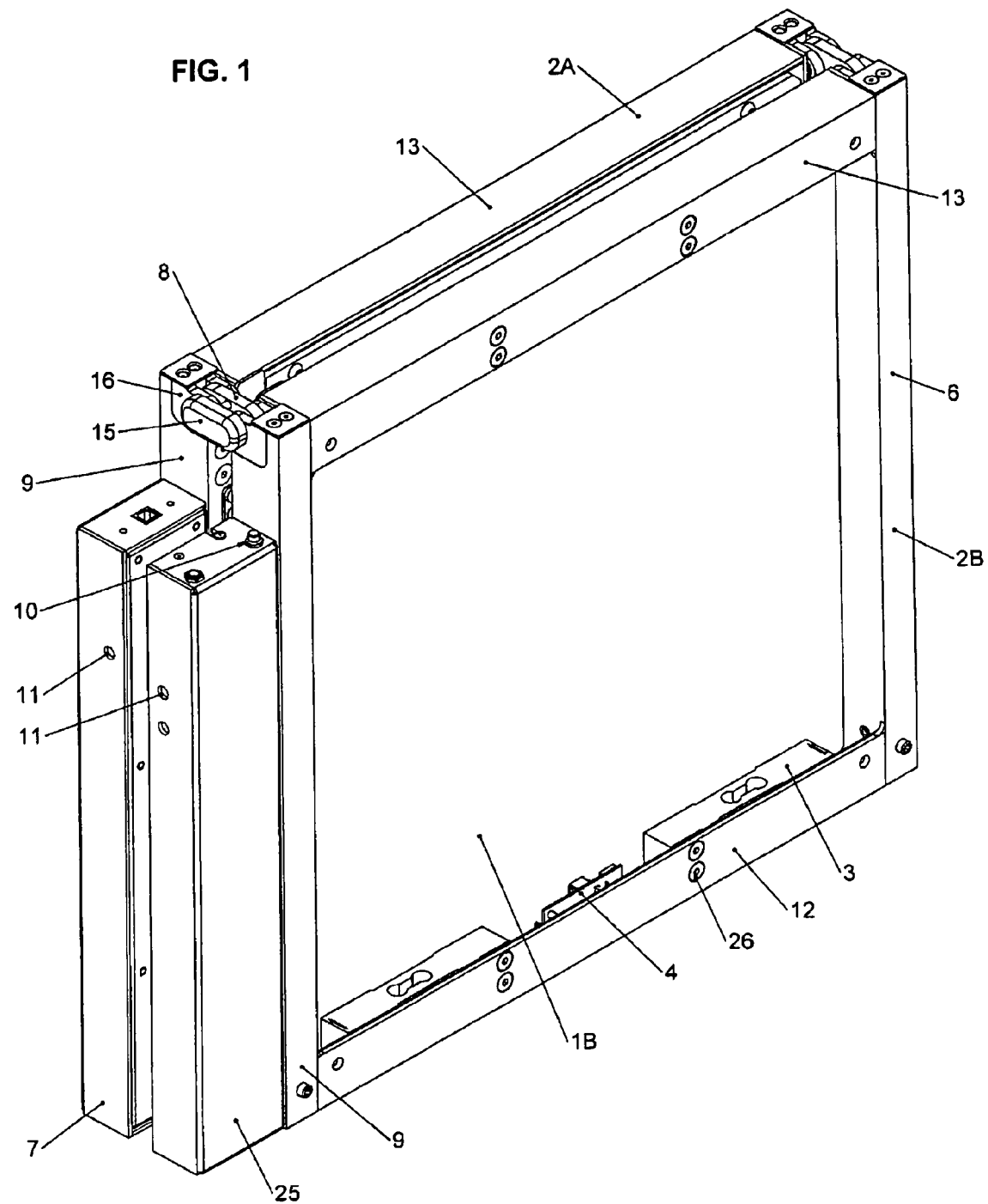
FIG. 1 is a top perspective view of the dual force plate apparatus of a preferred embodiment of the invention in a folded configuration.
Figure 2:
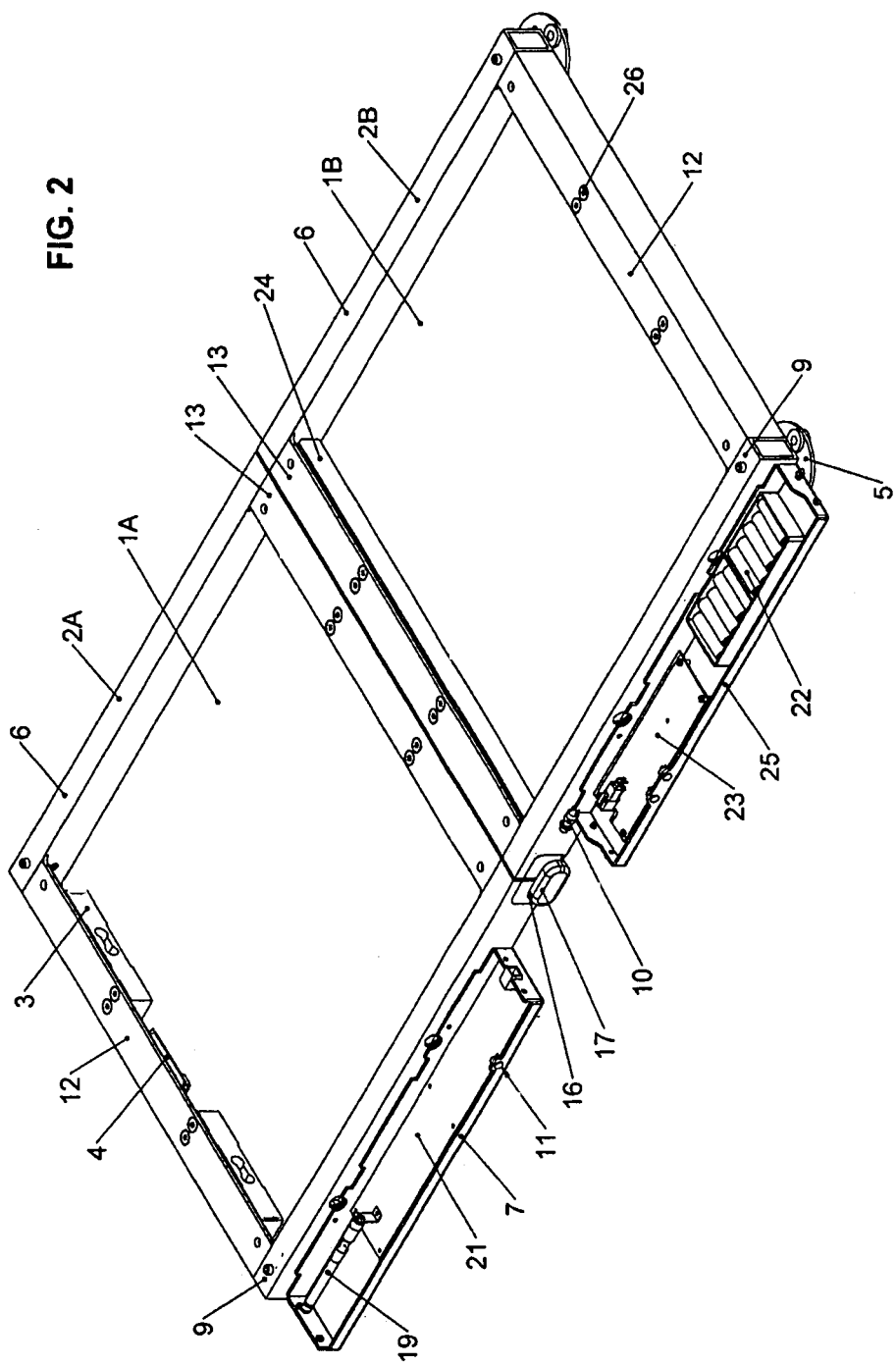
FIG. 2 is a perspective view of the dual force plate apparatus of FIG. 1 in an unfolded configuration.

Referring now to the drawings, an apparatus in accordance with a preferred embodiment of the invention is illustrated. The apparatus includes first and second rectangular force plates 1A and 1B mounted within respective first and second rigid rectangular frames 2A and 2B by means of at least one load cell 3 proximate each corner of each rectangular force plate. In an especially preferred embodiment, the plates 1A, 1B and the frames 2A, 2B define square outlines when viewed in plan. The second rigid rectangular frame 2B is secured to the first rigid rectangular frame 2A so as to prevent relative lateral movement therebetween, and each of the load cells 3 is operably connected to one or more microprocessor devices 21 for receiving a signal generated by each of the load cells 3 indicative of a force applied thereto. The plates 1A, 1B and the frames 2A, 2B In the illustrated preferred embodiment, the second rigid rectangular frame 2B is secured to the first rigid rectangular frame 2A by one or more hinges 8 so that the apparatus is selectively movable from a first extended position in which the first and second frames 2A and 2B, and thus the first and second plates 1A and 1B, are substantially coplanar and relative lateral movement between the frames is prevented, as shown in FIG. 2, and a second, folded position as shown in FIG. 1. As a result, in this embodiment the apparatus is readily portable.

In a further aspect of the illustrated preferred embodiment, the first plate 1A is recessed within the first frame 2A, the uppermost surface of the first plate 1A being spaced below the uppermost surface of the first frame 2A, and the second plate 1B is recessed within the second frame 2B, the uppermost surface of the second plate 1B being spaced below the uppermost surface of the second frame 2B. As used herein, upper or uppermost refer to the top of the apparatus as shown in the drawings, as opposed to the bottom or ground-engaging side of the apparatus. With recessed force plates 1A and 1B, the height by which a user positioned thereon is raised above the surface supporting the apparatus is minimized, enhancing the ability of the apparatus to be utilized at any desired location.

In use, the apparatus of the illustrated embodiment of the invention is in its extended or unfolded position, as shown in FIG. 2, wherein a golfer or other user stands with one foot in any location on the first force plate 1A and the other foot in any location on the second force plate 1B. The force plates 1A, 1B are rectangular, preferably square, in shape and are sized to accommodate a wide variety of foot sizes and stances. Where portability is desired, however, the force plates 1A, 1B are also not so large that transportation of the apparatus is difficult. The force plates 1A, 1B are formed of a material that is strong and rigid, remaining dimensionally stable under the forces experienced during use of the apparatus. The force plates 1A, 1B are preferably formed of forged aluminum for its combination of strength and low weight. The upper surface of each force plate 1A, 1B is preferably a non-slip surface.

The first and second force plates 1A and 1B are mounted within respective first and second rigid frames 2A and 2B by means of load cells 3. In the illustrated embodiment, each of the frames 2A, 2B is formed of a front frame member 6, a back frame member 9, an outer side frame member 12, and an inner side member 13. In the preferred illustrated embodiment, the front and back frame members 6 and 9 are formed of hollow tubes of generally rectangular cross-section, while the outer and inner side frame members 12 and 13 are generally U-shaped, the bottom-facing side being open. The innermost side of the outer side frame members 12 are not shown in FIGS. 1 and 2 so that the load cells 3 are visible. The corresponding cover portion 24 of the inner side frame 13 of frame 2B is shown in FIG. 2. The frame members 6, 9, 12, and 13 are formed of any suitably strong, rigid material, and are preferably welded aluminum.

Figure 5:
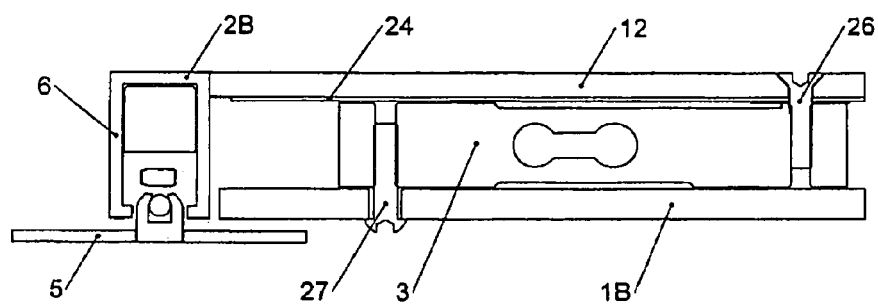
FIG. 5 is an enlarged sectional view taken along the lines A-A of FIG. 3.

In the illustrated embodiment, each of the force plates 1A and 1B is mounted within the respective first and second rigid frame 2A and 2B by means of one load cell 3 mounted proximate each corner of each rectangular force plate. In each case, two load cells 3 are attached to the upper side of the outer side frame member 12 so as to be housed therewithin. in the illustrated embodiment, as best shown in FIG. 5, each load cell 3 is secured to the frame member 12 by fasteners 26. Each load cell 3 is also secured to the respective force plate, plate 1B in FIG. 5, preferably at a location proximate the corner of the plate. In the illustrated embodiment of FIG. 5, each load cell 3 is secured to the force plate 1B by fasteners 27. In a like manner, and with respect to each plate, two load cells 3 are attached to upper side of the inner side frame member 13 so as to be housed therewithin. Thus, in this particularly advantageous embodiment, with the force plates 1A and 1B suspended from and mounted beneath the load cells 3, the force plates 1A and 1B are recessed within the frames 2A and 2B and are positioned as close to the surface supporting the apparatus as possible.

The load cells 3 may be any suitable type, but are preferably binocular-style bending beam type load cells. The load cells 3 are selected for being rated for operation to a desired weight depending upon the application, and may typically be rated for operation to 100 kg (220 lbs.) as an example. The mounting configuration in accordance with a preferred embodiment of the invention limits the deflection of the load cells to prevent the rating from being exceeded.

Figure 3:
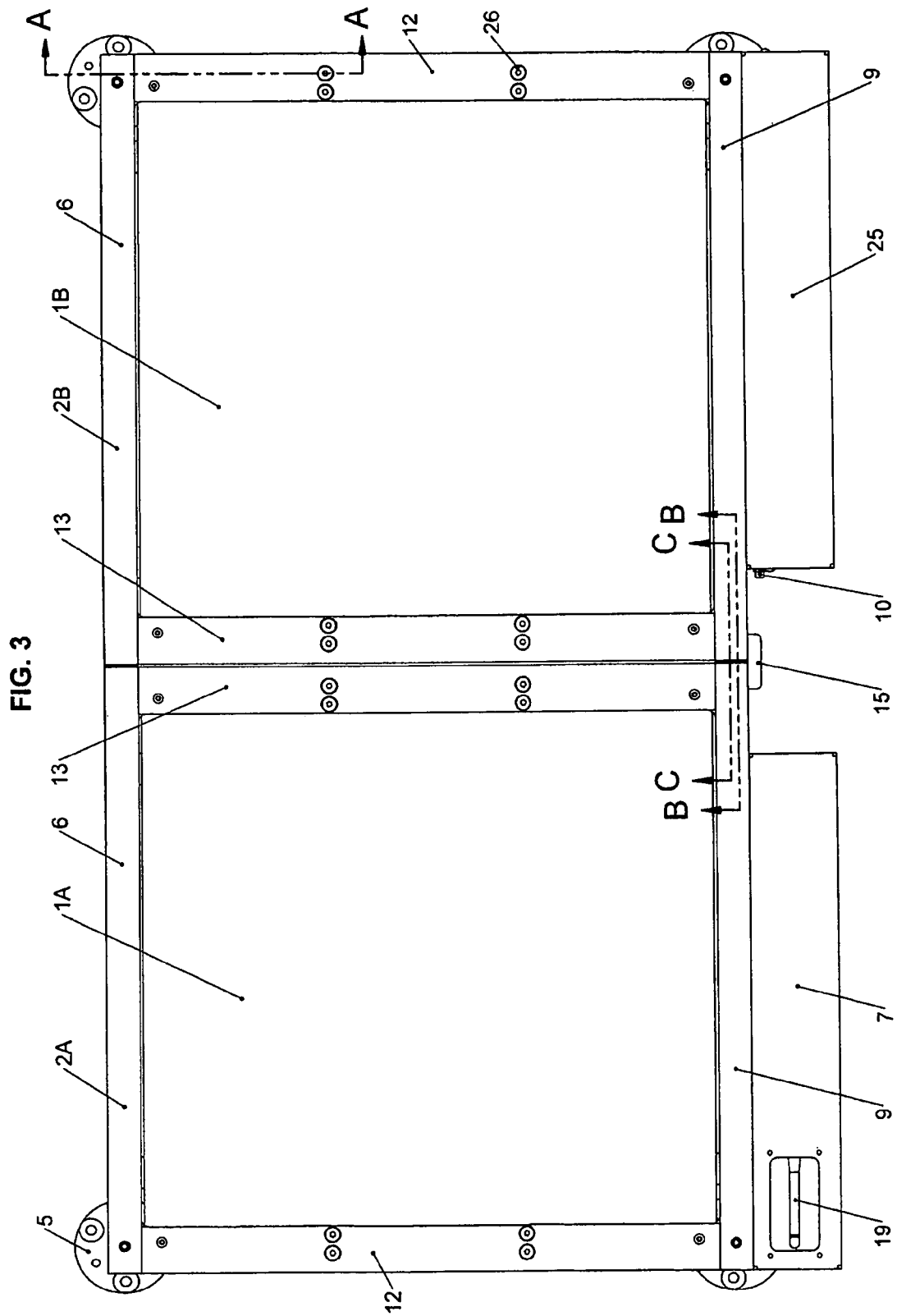
FIG. 3 is a top plan view of the dual force plate apparatus of FIG. 2.

Each of the load cells 3 is operably connected to one or more microprocessor devices 21 for receiving a signal generated by each of the load cells 3 indicative of a force applied thereto. In the illustrated embodiment, the load cells 3 directly sense the respective applied forces and transmit this data to a load cell interface printed circuit board PCB 4, housed within the inner side members 13 and outer side frame members 12, and thence to the microprocessor device 21. In the illustrated embodiment, the microprocessor device 21 is housed within an enclosure 7 secured to the back frame member 9 of the frame 2A. As shown, the enclosure 7 also houses an LED status indicator 11 and an embedded antenna 19 for wireless communication with, for example, a computer. The top cover portion of the enclosure 7 is shown in FIGS. 1 and 3, but is not shown in FIG. 2, to aid in illustration.

A battery enclosure may be secured, for example, to the back frame member 9 of the frame 2B. In the preferred illustrated embodiment, a rechargeable battery 22, preferably formed of individual cells, is housed within the enclosure 25 along with a charger board 23 for recharging of the battery. Of course, the rechargeable battery 22 allows the cable-free use of the apparatus in outdoor areas where no immediate electrical connection is possible and a standard DC power connection for inside use or to recharge the battery 22. A power button 10 may extend through the enclosure 25 so as to be accessible to the user. The top cover portion of the enclosure 25 is shown in FIGS. 1 and 3, but is not shown in FIG. 2, to aid in illustration.

Figure 4:
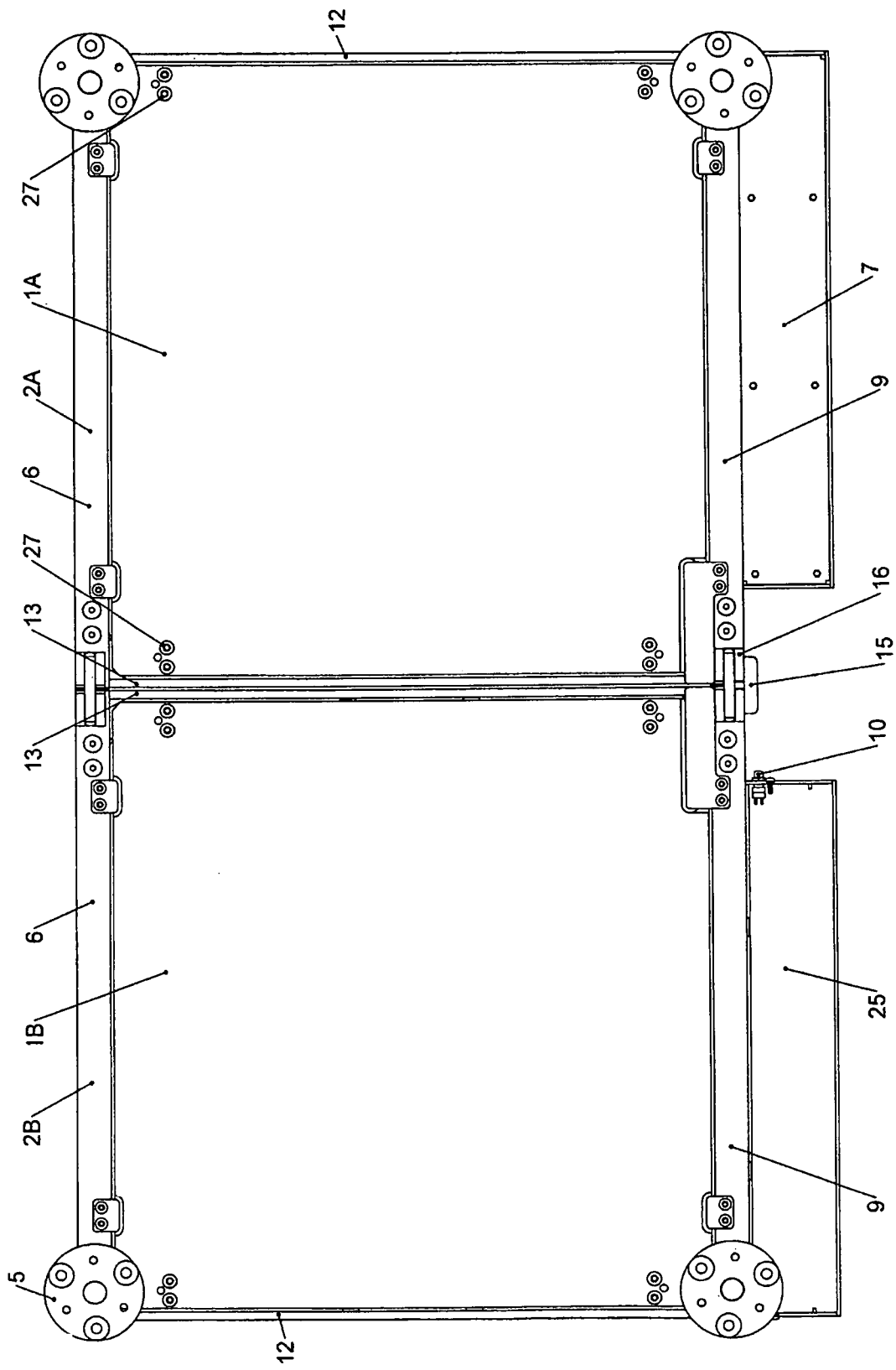
FIG. 4 is a bottom plan view of the dual force plate apparatus of FIG. 2.

Ground or support surface engaging feet 5 are provided in a preferred embodiment of the invention, one at the corner of each of the first and second frames 2A and 2B, as shown for example in FIG. 4. As further illustrated in FIG. 5, one such foot 5 may be secured proximate each end of each of the front frame members 6. The ground-engaging feet 5 may be adjustably secured to the respective frame so that the distance between a lowermost surface of the foot and the lowermost surface of the respective frame is capable of being varied, and hence the height of the frame above the ground is adjustable at each of the feet 5. This allows a means to level the apparatus so that the plates 1A and 1B are parallel to the ground, or to cant the entire apparatus at an angle to simulate a desired playing condition. The feet 5 may also be provided with interchangeable anchor posts in order to place the device upon different types of surfaces, such as a sand bunker or other non-uniform surface.

As noted above, the second rigid rectangular frame 2B is secured to the first rigid rectangular frame 2A so as to prevent relative lateral movement therebetween. Thus, in an embodiment of the invention intended for use in a permanent installation (not shown), the first and second frames may be permanently secured together in an orientation such as that illustrated in FIGS. 2 and 3, such as by welding, mechanical fasteners or the like.

Figure 6:
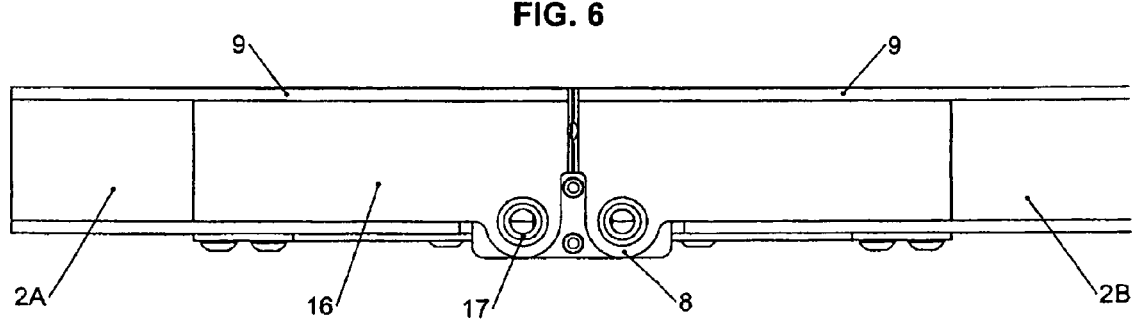
FIG. 6 is an enlarged sectional view taken along the lines B-B of FIG. 3.
Figure 7:
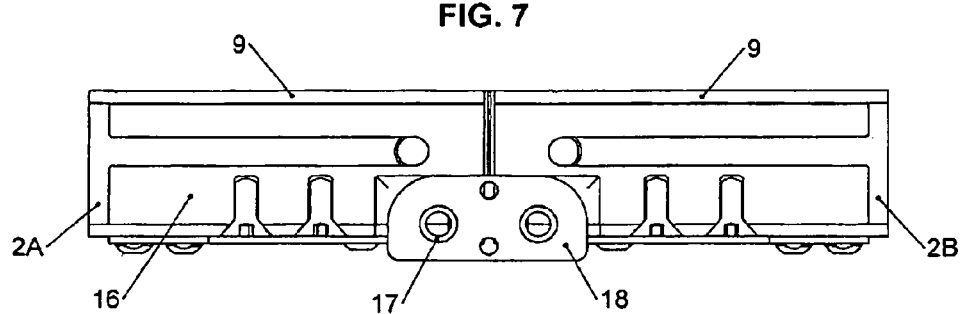
FIG. 7 is an enlarged sectional view taken along the lines C-C of FIG. 3.
Figure 8:
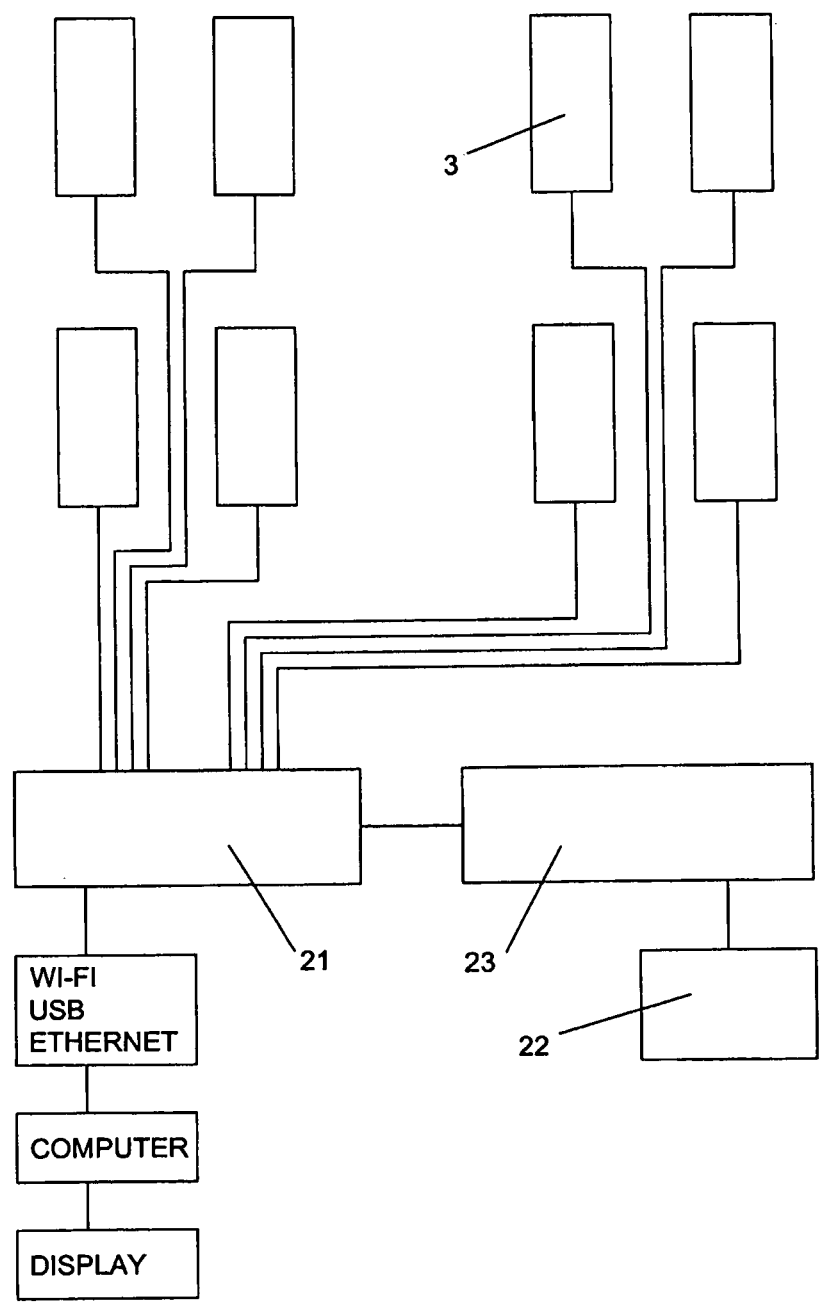
FIG. 8 is a block diagram of the apparatus of the invention as part of a system for analyzing a golf swing or other biomechanical movement.

In the readily portable apparatus of the preferred illustrated embodiment, the second rigid rectangular frame 2B is secured to the first rigid rectangular frame 2A by a pair of hinges 8. One of the hinges 8 is shown in detail in FIGS. 6 and 7. As shown, the hinge 8 is an assembly formed of a pair of hinge arms 16, one secured at each of the adjacent ends of the back frame members 9. Each of the hinge arms 16 is pivotally mounted to a hinge plate 18 acting as a floating link by means of a respective hinge pin 17. The hinge assemblies are configured so that the frames 2A and 2B can be folded, as shown in FIG. 1, in the direction of their respective bottom or lower surfaces. In the extended position, shown for example in FIGS. 2, 6 and 7, the ends of adjacent front and back frame members are abutting, cooperating with the ground or other support surface to maintain the apparatus in the extended position in which the first and second frames 2A and 2B are substantially coplanar. A hinge cover 15, shown in FIGS. 1, 3 and 4 but not in FIG. 2, is preferably provided on the rear hinge assembly to protect the wiring.

In use, the apparatus of the invention is able to measure forces in four directions simultaneously from each foot. The load cells 3 continuously collect data on forces and weight distribution and lateral motion of the front and back, and inside and outside, of each foot through displacement of the attached force plates throughout a golf swing or other sports activity. Such data is sent to a microcomputer PCB and transmitted via a wired or wireless connection to, for example, a computer for analysis and display in a continuous and immediate or other manner as desired, as is well known, and preferably in a form which is easy to interpret by the player and can be played back and frozen or slowed during any part of the swing for complete analysis.

When, for example, a golfer shifts position or shifts his weight while standing on the force plate apparatus of the invention in preparation for or during the backswing, pause at the top of the swing, downswing, or ball strike, the load cells 3 are able to directly sense the changes in force in a continuous manner and transmit this data to the load cell interface PCB 4 and thence to the microprocessor device 21. The apparatus thus provides increased sensitivity to components of the generated data, while being able to continuously measure data from four locations on each force plate. The sensitivity is great enough to clearly demonstrate body weight changes at the moment of impact of golf club and golf ball without the need of another method to verify this, although independent means of verifying the moment of ball strike, such as by auditory or visual (via light beam interruption), may also be employed with the apparatus of the invention.

Further, the dual force plate apparatus of the invention may optionally be utilized in connection with other devices to enhance the information generated and displayed. Thus, one or more video cameras may be employed to capture the images of the player executing the sports or other biomechanical movement. An accelerometer may be used to determine to the three dimensional position of the apparatus.

The dual force plate apparatus of the invention is preferably utilized with a computer-based method of capturing and analyzing data from the load cells 3 by time-stamping all data and correlating that time stamp to all processed signals generated in each moment, including relative magnitudes and positions of the forces, generating real-time weight change, video, and ball strike and trajectory data. The force data generated by the load cells 3 may preferably be used to provide direct tracking of the movement of the player's center of gravity throughout the sports action, including ball strike, allow real-time, slow-motion, and freeze-frame playback, and provide simultaneous and/or differential analysis of all elements of the continuum of the activity without the aid of a skilled third party.

The apparatus of the invention thus provides a means to accurately assess sports, physical and biomechanical performance of a user in virtually any location or environment.

In accordance with the provisions of the patent statutes, the invention has been described in what is considered to represent its preferred embodiments. However, it should be noted that the invention could be practiced otherwise than as specifically illustrated and described without departing from its spirit or scope. As an example, it will be appreciated that, in those embodiments in which the apparatus includes a plurality of projections, the size and shape of the projections may vary considerably.

We claim:

1. An apparatus for analyzing a golf swing or other biomechanical movement used repetitively in sports activity or simulated sports environmental activity setting, comprising:
    a first rectangular force plate mounted within a first rigid rectangular frame by means of at least four load cells, with at least one load cell proximate each corner of the first rectangular force plate; and
    a second rectangular force plate mounted within a second rigid rectangular frame by means of at least four load cells, with at least one load cell proximate each corner of the first rectangular force plate, the second rigid rectangular frame being secured to the first rigid rectangular frame so as to prevent relative lateral movement therebetween;
    wherein each of the load cells is operably connected to one or more microprocessor devices for receiving a signal generated by each of the load cells indicative of a force applied thereto.

2. The apparatus of claim 1, wherein the second rigid rectangular frame is secured to the first rigid rectangular frame by one or more hinges so that the apparatus is selectively movable from a first extended position in which the first and second plates are substantially coplanar and relative lateral movement between the frames is prevented, and a second folded position in which transportation of the apparatus is facilitated.

3. The apparatus of claim 1, wherein the first plate is recessed within the first frame, the uppermost surface of the first plate being spaced below the uppermost surface of the first frame, and the second plate is recessed within the second frame, the uppermost surface of the second plate being spaced below the uppermost surface of the second frame.

4. The apparatus of claim 1, wherein the first plate is suspended from each of the load cells mounted to the first frame and the second plate is suspended from each of the load cells mounted to the second frame.

5. The apparatus of claim 1, wherein the first and second frames maintain the first plate in a coplanar relationship with the second plate.

6. The apparatus of claim 1, further comprising at least two ground-engaging feet mounted to the first frame and at least two ground-engaging feet mounted to the second frame.

7. The apparatus of claim 6, wherein one or more of the ground-engaging feet is adjustably mounted to the respective frame so that the distance between a lowermost surface of the foot and the lowermost surface of the respective frame is capable of being varied.

8. The apparatus of claim 1, wherein the first and second rectangular force plates and the first and second rectangular frames are each square.

9. The apparatus of claim 1, wherein the one or more microprocessor devices are in communication data with a computer for analysis and display of data.

10. The apparatus of claim 9, wherein the one or more microprocessor devices are in communication data with the computer via a wireless connection.

11. The apparatus of claim 9, further comprising a ball striker sensor which in communication with the computer.

12. The apparatus of claim 9, further comprising one or more video cameras capable of capturing images of a user of the apparatus and communicating such images to the computer.

13. The apparatus of claim 9, further comprising an accelerometer for determining the three dimensional position of the apparatus and communicating such position to the computer.

14. A computer-based method of capturing and analyzing data to analyze a player's golf swing or other biomechanical movement used repetitively in sports activity or simulated sports environmental activity setting, comprising:
    providing a first rectangular force plate mounted within a first rigid rectangular frame by means of at least four load cells, with at least one load cell proximate each corner of the first rectangular force plate, and a second rectangular force plate mounted within a second rigid rectangular frame by means of at least four load cells, with at least one load cell proximate each corner of the first rectangular force plate, the second rigid rectangular frame being secured to the first rigid rectangular frame so as to prevent relative lateral movement therebetween, wherein each of the load cells is operably connected to one or more microprocessor devices for receiving a signal generated by each of the load cells indicative of a force applied thereto;
    generating signals from each of the load cells indicative of a force applied thereto during the golf swing or other biomechanical movement, the one or more microprocessor devices receiving the signals; and
    time-stamping and correlating that time stamp to all processed signals generated in each moment, including relative magnitudes and positions of the forces, generating real-time weight change, video, and ball strike and trajectory data.

15. The method of claim 14, further comprising:
    a. directly tracking the movement of the player's center of gravity throughout the golf swing or other biomechanical movement, including at the moment of a ball strike;
    b. providing computer software that allows for real-time, slow-motion, and freeze-frame playback of the processed signals, and
    c. providing simultaneous and/or differential analysis of all elements of the continuum of the golf swing or other biomechanical movement without the aid of a skilled third party.

* * * * *